M. SCHENKEL.
TRANSFORMATION OF DIRECT CURRENT.
APPLICATION FILED MAR. 29, 1917. RENEWED FEB. 9, 1921.
1,418,477.
Patented June 6, 1922.
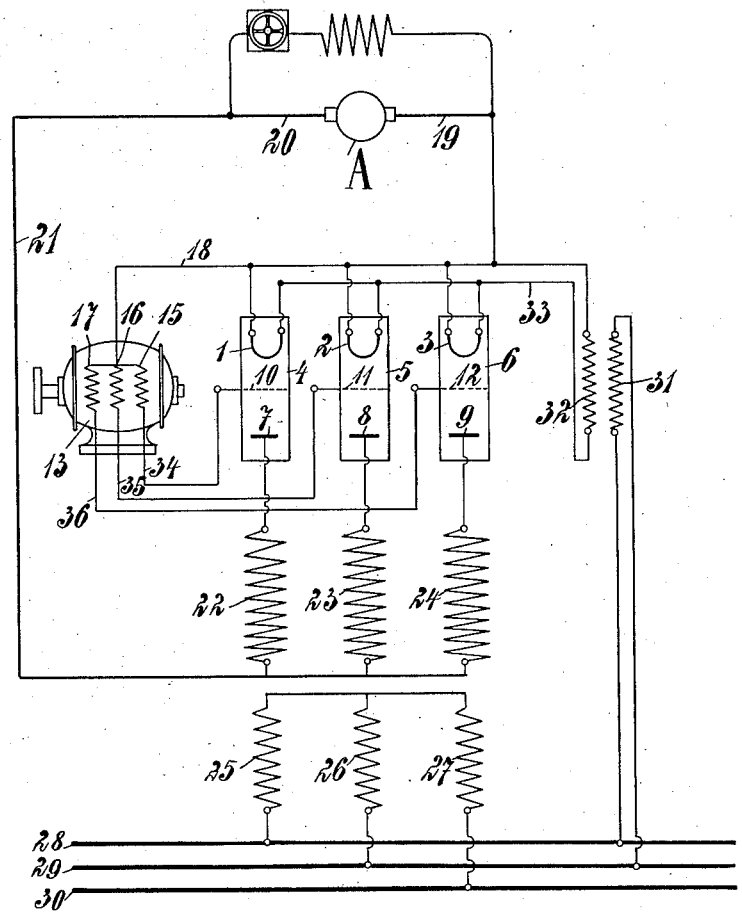

UNITED STATES PATENT OFFICE.

MORITZ SCHENKEL, OF CHARLOTTENBURG, NEAR BERLIN, GERMANY, ASSIGNOR TO SIEMENS SCHUCKERTWERKE G. M. B. H., OF BERLIN, GERMANY, A CORPORATION OF GERMANY.

TRANSFORMATION OF DIRECT CURRENT.

1,418,477. Specification of Letters Patent. Patented June 6, 1922.

Application filed March 29, 1917, Serial No. 158,467. Renewed February 9, 1921. Serial No. 443,727.

*To all whom it may concern:*

Be it known that I, MORITZ SCHENKEL, a citizen of the German Empire, and resident of Charlottenburg, near Berlin, Germany, have invented certain new and useful Improvements in the Transformation of Direct Current, (for which I have filed an application in Germany March 14, 1916, Serial No. 45047–21G,) of which the following is a specification.

My invention relates to the transformation of direct current, and more especially high voltage direct current, into single-phase or multi-phase alternating current, such as for instance three-phase alternating current.

The problem of transforming direct current into alternating current is of great interest in connection with the transmission of electric energy over long distances inasmuch as the effects of inductivity and capacity are far lower with direct current than with alternating current and may even go down to zero. Likewise the drop of potential in a high voltage direct current transmission line is lower; the saving in copper for the conductors is not less than with alternating current.

The particular object of the present invention is a method and means for effecting said transformation in a more perfect manner than has heretofore been possible.

As is well known, alternating current can be transformed into high voltage direct current by means of rectifiers such as mercury vapor apparatus or glow cathode vacuum tubes. It is further known that it is possible to transform direct current into alternating current by the same means, that is to say with the aid of rectifiers of the kind mentioned above, this being described for instance in a patent issued to Charles P. Steinmetz on the eleventh of April 1905, #787,228. However many difficulties were encountered in effecting this latter transformation. According to the said method the direct current is fed into the negative electrode or cathode of a vapor electric apparatus provided with a plurality of anodes, the said anodes being connected to the terminals of as many transformers as correspond to the number of phases of the alternating current to be obtained.

However in apparatus of this kind the frequency of the alternating current obtained, which mainly depends, according to Steinmetz, on the size of the different parts of the apparatus, has no constant value, but varies continuously. For this reason the system described does not answer to the requirements of practical use.

According to another method the direct current is fed into an electric vacuum apparatus comprising a cathode, an anode and means for heating the cathode, such apparatus acting also like a valve inasmuch as the cathode when hot will allow the current to pass through the apparatus onto the anode, while the same cathode, when cold, will not allow the passage so that then the path of the current is obstructed. By intermittently heating and cooling the cathode the direct current fed into the cathode is allowed to pass through the apparatus in the form of current impulses rapidly succeeding each other, and by sending this pulsatory current alternately into one or the other of a plurality of transformer primaries, the direct current may be transformed into multiphase alternating current. This system, however, has the disadvantage that while the heating up of the cathode takes very little time, the cooling proceeds far more slowly, the vacuum and the specific heat of the cathode material preventing a rapid drop of temperature. Now the duration of the single pulsations of current required for the production of alternating current should not exceed a fraction of a second, whereas the changes of temperature of the cathode take much more time and in any case more than a full second. For this reason the systems above described are of no practical value in solving the problem in question.

There is a means, however, of utilizing such apparatus in the transformation of high voltage direct current into alternating current. According to the present invention I obtain the result aimed at by feeding the high voltage direct current into a vacuum apparatus of the sort described and by alternately barring and opening the way to the passage of electro-ions through the space separating the cathode from the anode.

Now it is old per se to bar and bridge the way to the passage of electro-ions through the space separating the cathode and anode of a vacuum apparatus in order to obtain pulsatory currents and I do not claim this step as such. My invention resides in its utilization for the conversion of the current impulses generated within said tube into alternating current by aid of a suitable transformer.

If the pulsations generated in such a vacuum apparatus are transmitted to a transformer, a single-phase alternating current will be produced, whose frequency corresponds to the frequency of pulsations. In order to produce alternating currents of any desired number of phases it is only necessary to provide a separate vacuum apparatus (or a separate pair of electrodes) and a separate transformer for each phase and to so control the alternations of conductivity in the said vacuum apparatus that the passage of current through them takes place in accordance with the single phases.

In carrying out my invention I may for instance employ a vacuum apparatus of the kind described in U. S. patent specification 879532, said apparatus consisting of an evacuated vessel having sealed therein three conducting members, one forming the cathode being connected with a source of electric current of sufficient strength to heat said cathode, while another electrode opposite said cathode serves as an anode. Interposed between the cathode and the anode is an auxiliary anode preferably of grid-shape, which on being fed with potential forms a bar to the passage of current between the cathode and the anode, the electric charge of the auxiliary electrode influencing the conductivity of the space separating the cathode and anode, according to whether it has a positive or a negative potential, in the sense of either reinforcing or stopping the emission of electrons from the hot cathode. The emission of electrons will be reinforced whenever the potential becomes positive, while it is decreased whenever the potential becomes negative. By making the negative potential great enough an emission of electrons from the cathode and their passage to the anode is almost completely stopped. Now by controlling the charging and discharging of the auxiliary electrode and the generating of electrostatic fields in the auxiliary electrode in such a manner that a suitable number of interruptions per second of the passage of current between the cathode and the anode is effected, the direct current passing from the cathode to the anode is divided into impulses following each other in more or less rapid succession, and the pulsatory current thus obtained, on being fed into the primary winding of a transformer, is transformed into alternating current, the number of phases and frequency of this alternating current depending upon the number of vacuum apparatus (or pairs of electrodes) and of transformers and upon the speed at which the excitations of the auxiliary electrodes in the said vacuum apparatus alternate with each other.

My invention will be described with reference to the drawings which accompany and form a part of the specification, although it is to be understood that many modifications may be made in the apparatus and systems herein described without departing from the principle of my invention.

The drawing shows diagrammatically a system of connections that may be used in carrying out my invention.

In the drawing a source of direct current is indicated conventionally at A. From this source is derived a direct current which is to be transformed into three-phase alternating current. 4, 5, 6 are separate evacuated vessels, preferably glass vessels, enclosing each a cathode 1, 2, 3, and anode 7, 8, 9 and a grid-shaped auxiliary electrode 10, 11, 12 interposed between said cathodes and anodes. The auxiliary cathodes may consist of metal wires interlaced with each other or of metallic rods disposed either parallel to or crossing each other or they may be constructed in any other suitable manner. 13 is a small auxiliary alternating current generator having its three phases 15, 16, 17 connected in star fashion, each phase supplying current through wires 34, 35, 36 to one of the auxiliary electrodes 10, 11, 12, while the star point is connected to wire 18 connecting the three cathodes.

19, 20 are the direct current mains supplied with current from the generator A, the negative wire 19 being connected with wire 18, while the positive wire 20 is connected, by aid of a wire 21, with the star point of primaries 22, 23, 24 of a transformer, the free ends of each primary being connected to one of the anodes 7, 8, 9. 25, 26, 27 are the secondary coils of the three-phase transformer, their free ends being connected to the three-phase current mains 28, 29, 30. From these mains a small auxiliary transformer 31, 32 is supplied with current, said transformer furnishing the current for heating the cathodes 1, 2, 3, its secondary coil being connected with said cathodes by wires 18 and 33.

Upon the cathodes 1, 2, 3 being heated to incandescence and the auxiliary generator 13 placing the auxiliary electrodes 10, 11, 12 under tension, currents of variable force are sent from the direct current mains 19, 20 into the primary windings 22, 23, 24 of the transformer. These currents will by induction generate alternating current and alternating voltages in the secondary coils 25, 26, 27 of the transformer combining into a three-phase current system which feeds the mains 28, 29, 30. The number of periods in these mains corresponds to the number of periods of the auxiliary generator 13 serving both as a regulator and a switching apparatus. The voltage in the alternating current main will depend on the ratio of transformation of the transformer and on the voltage in the direct current mains. The voltage curve in the alternating current mains will correspond to the curve of the generator 13 and can be varied together with and by aid of the said generator.

Instead of three different vacuum apparatus containing each a cathode, an anode and an auxiliary electrode a single apparatus enclosing all the electrodes may be employed. Instead of a plurality of cathodes a single cathode may be employed, this cathode sending direct current to a plurality of anodes. Instead of heating the cathodes by aid of the current generated in the primary of the transformer 31, 32 such heating current may also be furnished by some other source of current.

The particular construction of the vacuum apparatus and the electrodes enclosed therein may be varied in accordance with any well known system of vacuum apparatus such as used as lamps or rectifiers, and the auxiliary devices used in such apparatus, such as the means for cooling the same may be equally applied to the vacuum apparatus used in connection with my invention.

I claim:—

1. A system of transformation of direct current into multiphase alternating current comprising a source of direct current, a plurality of vacuum tubes, a plurality of primary and secondary transformer windings, a cathode within each vacuum tube connected to said source of direct current, an anode within each vacuum tube, each anode being connected to one end of one of said primary windings of said transformer, a connection from said source of direct current to the other ends of said primary windings, and means connected with said vacuum tubes and for alternately generating and effacing an electrostatic field between each of said pairs of cathodes and anodes at the frequency and phase relation of the desired alternating current.

2. A system of transformation of direct current into multiphase alternating current comprising a source of direct current, a plurality of vacuum tubes, a plurality of primary and secondary transformer windings, a cathode within each vacuum tube connected to said source of direct current, an anode within each vacuum tube, each anode being connected to one end of one of said primary windings of said transformer, a connection from said source of direct current to the other ends of said primary windings, an auxiliary electrode within each vacuum tube extending into the space separating the said cathode and anode and means connected with each vacuum tube for alternately generating and effacing by aid of said auxiliary electrode an electrostatic field between said cathode and said anode at the frequency and phase relation of the desired alternating current.

3. A system of transformation of direct current into alternating current comprising a source of direct current, a vacuum tube, a primary and a secondary transformer winding, a cathode within said vacuum tube connected to said source of direct current, an anode within said vacuum tube connected to the primary transformer winding, a connection from said source of current to the free end of said winding, a substantially grid-shaped auxiliary electrode extending into the space separating the said cathode and anode and means connected with said vacuum tube for alternately generating and effacing by aid of said auxiliary electrode an electrostatic field between said cathode and said anode at the frequency of the desired alternating current.

4. A system of transformation of direct current into multiphase alternating current comprising a source of direct current, a plurality of vacuum tubes, a plurality of primary and secondary transformer windings, a cathode within each vacuum tube connected to said source of direct current, an anode within each vacuum tube, each anode being connected to one end of one of said primary windings of said transformer, a connection from said source of direct current to the other ends of said primary windings, a substantially grid-shaped auxiliary electrode within each vacuum tube extending into the space separating the said cathode and anode, and means connected with each of said vacuum tubes for alternately generating and effecing by aid of said auxiliary electrode an electrostatic field between said cathode and said anode at the frequency and phase relation of the desired alternating current.

5. A system of transformation of direct current into multi-phase alternating current, comprising a source of direct current, a plurality of vacuum apparatus, a plurality of primary and secondary transformer windings, a cathode within each vacuum apparatus connected to said source of direct current, an anode within each vacuum apparatus connected to one end of one of said primary transformer windings, a connection from said source of direct current to the other ends of said windings, an auxiliary electrode arranged within each vacuum apparatus between said cathodes and said anodes and an auxiliary multi-phase alternating current generator having each phase connected to a different auxiliary electrode.

MORITZ SCHENKEL.